United States Patent
Hynd et al.

(10) Patent No.: US 9,623,785 B2
(45) Date of Patent: Apr. 18, 2017

(54) TRAILER ASSEMBLY

(71) Applicant: James Hynd, Mariners Cove, Western Australia (AU)

(72) Inventors: James Hynd, Mariners Cove (AU); Dale James Hynd, Halls Head (AU)

(73) Assignee: James Hynd, Mariners Cove, Western Australia (AU)

( * ) Notice: Subject to any disclaimer, the term of this patent is extended or adjusted under 35 U.S.C. 154(b) by 0 days.

(21) Appl. No.: 14/990,732

(22) Filed: Jan. 7, 2016

(65) Prior Publication Data

US 2016/0193952 A1     Jul. 7, 2016

(51) Int. Cl.
*B62D 21/00*     (2006.01)
*B60P 3/10*     (2006.01)
*B62D 63/06*     (2006.01)

(52) U.S. Cl.
CPC .......... *B60P 3/1033* (2013.01); *B62D 63/061* (2013.01)

(58) Field of Classification Search
CPC ............................... B60P 3/1033; B60P 3/105
USPC ..... 214/505, 83.24, 506, 84, 516; 280/414.1
See application file for complete search history.

(56) References Cited

U.S. PATENT DOCUMENTS

| | | | |
|---|---|---|---|
| 2,765,941 A | 7/1953 | Mamo | |
| 2,995,262 A | 8/1958 | Case | |
| 3,856,168 A | 12/1974 | Mauck | |
| 4,464,092 A * | 8/1984 | Chambers | B60P 3/1066 193/37 |
| 4,717,165 A * | 1/1988 | Johnson | B60P 3/1066 280/414.1 |
| 5,417,447 A * | 5/1995 | Godbersen | B60P 3/1066 254/369 |
| 5,678,838 A * | 10/1997 | Taylor | B60P 3/06 280/413 |
| 5,725,247 A * | 3/1998 | Nilsson | B62D 21/02 280/781 |
| 6,189,930 B1* | 2/2001 | Kalazny | B62D 21/02 280/781 |
| 7,793,981 B2* | 9/2010 | Xie | B62D 21/02 280/785 |
| 7,976,029 B2* | 7/2011 | Plummer | B60G 17/017 280/414.1 |
| 2012/0313346 A1* | 12/2012 | Steins | B62D 63/065 280/401 |
| 2013/0119650 A1* | 5/2013 | Garceau | B60G 11/225 280/789 |

* cited by examiner

*Primary Examiner* — Jacob Knutson
(74) *Attorney, Agent, or Firm* — Andrew W. Chu; Craft Chu PLLC

(57) ABSTRACT

A boat trailer can be disassembled and packaged as a "flat-pack" system which will minimize the storage space required as well as the transport and production cost of larger boat trailers. The trailer can then be reassembled by a dealer or the end customer upon delivery. The boat trailer includes a support frame supported on the ground by wheels at a stern section thereof and a tow bar at a bow section thereof. The boat trailer includes separate frame components which can be disassembled into a flat pack form and joined together in series to form the assembled boat trailer.

7 Claims, 9 Drawing Sheets

TRAILER ASSEMBLY

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a trailer assembly. The description is directed to boat trailers, but is not limited to this type of trailer.

2. Description of Related Art Including Information Disclosed Under 37 CFR 1.97 and 37 CFR 1.98

One of the big difficulties with the sale and delivery of boat trailers, and trailers in general, is that they are large bulky items. Typically, a boat trailer is 7 to 10 m long and 2.5 m wide.

These trailers take up a large amount of space when storing them and they are very expensive to transport/deliver to distributors and or customers. This makes it very difficult to supply to customers in other states or customers in other cities.

The present invention seeks to overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE INVENTION

According to a first aspect, the present invention provides a trailer assembly which can be disassembled, the trailer assembly comprising a support frame, wherein longitudinal portions of the support frame are divided into frame members which are connectable to each other.

In one embodiment, the support frame is supported on the ground by wheels at a stern section thereof and a tow bar at a bow section thereof.

In another embodiment, the support frame comprises a stern section and a bow section, the stern section comprising lateral rear beams disposed spaced and generally parallel to each other, and the bow section comprising bow beams for connection to the rear beams.

In one embodiment, the bow beams comprise intermediate beams for connection to front ends of the rear beams.

In another embodiment, the intermediate beams extend forwardly from the rear beams, and are angled towards each other.

In another embodiment, the bow beams further comprise front beams for connection to front ends of the intermediate beams.

In another embodiment, the front beams are angled towards each other, with front ends thereof joined to each other.

In another embodiment, the support frame comprises a plurality of spaced cross beams extending between the rear beams and the bow beams.

In another embodiment, the cross beams are bowed downwardly at mid-portions thereof.

In another embodiment, the trailer comprises wheel assemblies for attachment to the stern section, each wheel assembly comprising an axle with a wheel at each end thereof, wherein the axle is attached to the rear beams.

In another embodiment, the axles are bowed downwardly at mid-portions thereof.

In another embodiment, the tow bar extends forwardly between front ends of the front beams, and terminates with a tow ball coupling at a front end thereof.

In another embodiment, the components of the trailer assembly can be disassembled and packed into a substantially flat pack manner along a package having a footprint of less than 20 percent of the footprint of the fully assembled trailer.

In another embodiment, the trailer assembly comprises connection means for connecting the respective adjacent ends of the frame members.

In one embodiment, the connection means comprises connection plates spanning across the junction between the respective adjacent frame members ends, the connection plates comprising bolt apertures for alignment with corresponding bolt apertures formed in the frame members.

In another embodiment, the frame members are I-beams.

In another embodiment, the connection plates comprise at least one C-shaped plates to be disposed adjacent inner surfaces of the I-beams.

In another embodiment, the connection plates comprise at least one bent splice plate, wherein each bent plate comprises a channel for receiving a top flanges and/or a bottom flange of the I-beam.

In another embodiment, the connection plates are welded to one of the frame members, and then attachable to the other frame members.

In another embodiment, the frame members are cut to provide a split overlap joint, the ends thereof being mirror cut to provide overlapping portions which can then be attached to each other.

In another embodiment, the frame members comprises hollow sections connectable via an insert disposed to extend between the ends of the hollow sections.

In another embodiment, longitudinal portions of the support frame comprise three or more frame members connectable in series, the support frame further comprising spaced cross beams extending between the longitudinal portions, the cross beams being bowed downwardly at their mid-portions, and wheel assemblies attachable to the support frame Other aspects of the invention are also disclosed.

BRIEF DESCRIPTION OF THE DRAWINGS

Notwithstanding any other forms which may fall within the scope of the present invention, preferred embodiments of the present invention will now be described, by way of examples only, with reference to the accompanying drawings.

DETAILED DESCRIPTION OF THE DRAWINGS

Figure 1:
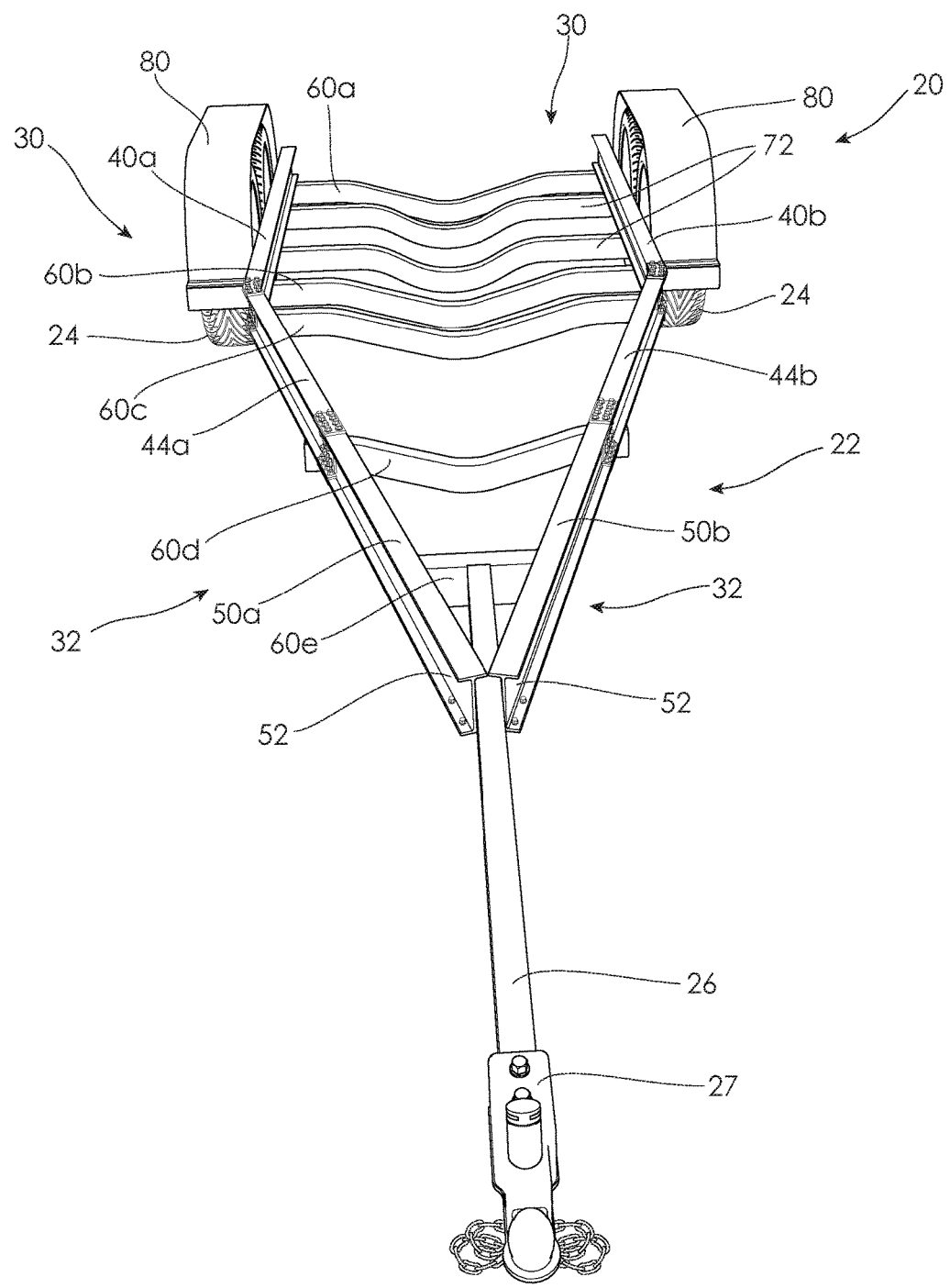
FIG. 1 is a front perspective view of a boat trailer in accordance with a preferred embodiment of the present invention, in an assembled configuration thereof.
Figure 2:
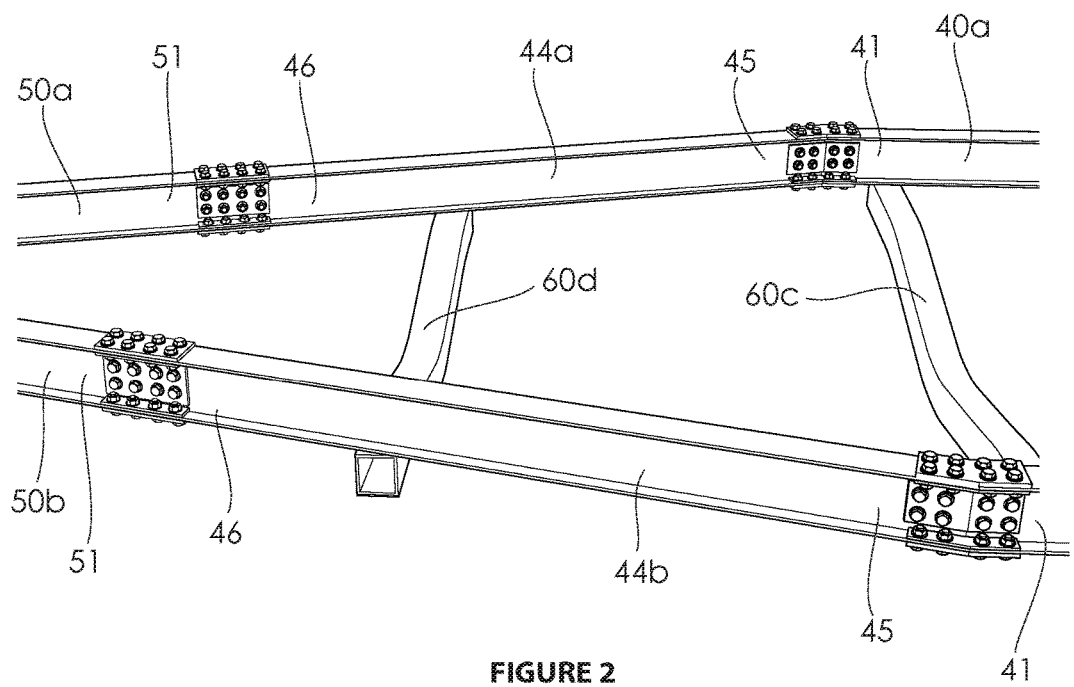
FIG. 2 is a side perspective view of a bow section of the boat trailer of FIG. 1.
Figure 3:
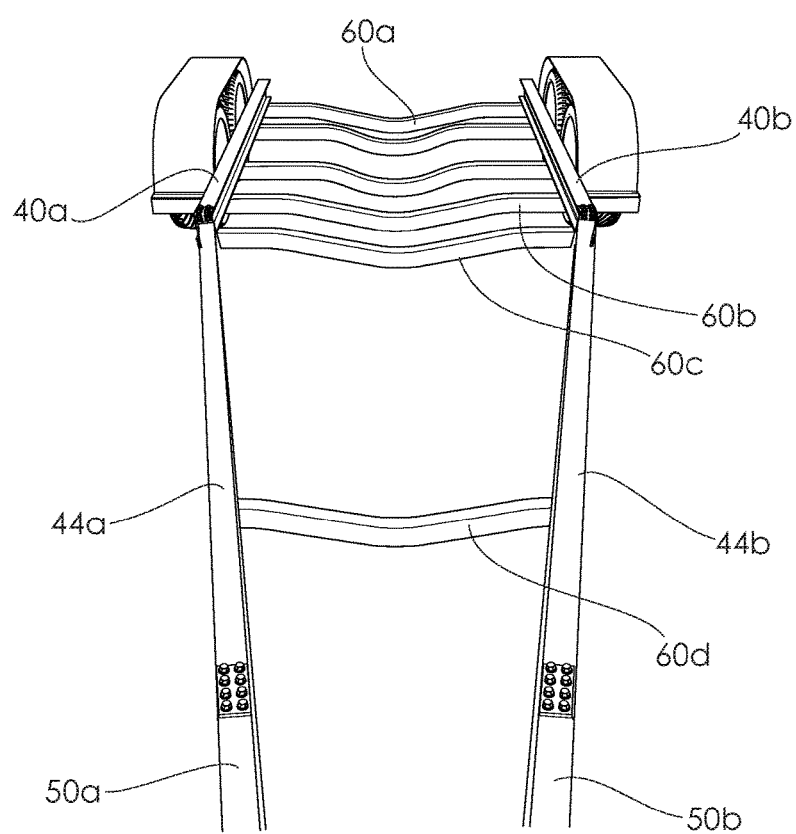
FIG. 3 is a front perspective view of a stern section of the boat trailer of FIG. 1.

It should be noted in the following description that like or the same reference numerals in different embodiments denote the same or similar features.

Referring initially to FIGS. 1 to 3 and 12, there is shown a boat trailer 20 according to a preferred embodiment of the present invention. The present invention relates to a boat trailer which can be disassembled and packaged as a "flat-pack" system which will minimize the storage space required as well as the transport and production cost of larger boat trailers (typically for 5.5 m to 10 m boats). The trailer can then be reassembled by a dealer or the end customer upon delivery.

The boat trailer 20 in FIGS. 1 to 3 and 12 is shown in its assembled configuration. The boat trailer 20 comprises a support frame 22 supported on the ground by wheels 24 at a stern section 30 thereof and a tow bar 26 at a bow section 32 thereof. The tow bar 26 is for attachment to a tow vehicle as is known.

The boat trailer 20 comprises separate frame components which can be disassembled into a flat pack form and joined together to form the assembled boat trailer. The following description refers to the position and orientation of the frame components in the assembled configuration of the boat trailer.

The stern section 30 comprises first and second lateral rear beams 40a and 40b disposed spaced and parallel to each other. Each beam 40 extends longitudinally along each lateral side, adjacent respective wheels 24. The beams 40 in the embodiment are I-beams.

Rear ends 45 of first and second intermediate beams 44a and 44b are respectively connected to front ends 41 of the rear beams 40. The intermediate beams 44 extend forwardly from the rear beams 40, and are angled towards each other. The connection means between the ends 41 and 45 is described below. The beams 44 in the embodiment are also I-beams. The end faces of the ends 41 and 45 are cut at an angle as needed to provide the angled orientation of the beams 44 relative to the beams 40.

Rear ends 51 of first and second front beams 50a and 50b are respectively connected to front ends 46 of the intermediate beams 44. The front beams 50 extend and continue in a straight orientation from the intermediate beams 44, and are thus angled towards each other, with their front ends 52 joined to each other. The connection means between the junction ends 46 and 51 is described below. The beams 50 in the embodiment are also I-beams.

The support frame comprises a plurality of spaced cross beams 60 respectively extending between the pairs of lateral beams 40, 44 and 50, connecting and supporting the lateral beams to each other. The cross beams 60 in the embodiment are square hollow section (SHS) beams. Cross beam 60a, 60b and 60c extend between the rear beams 40. The cross beam 60a is disposed adjacent rear ends of the rear beams 40, the cross beam 60c is disposed adjacent front ends 41 of the rear beams 40, and the cross beam 60b is disposed spaced rearwardly from the cross beam 60c.

A cross beam 60d extends between the intermediate beams 44, close to the front end 46 thereof. A cross beam 60 extends between the front beams 44, close to the front end 52 thereof. Each of the beams 60 are bowed downwardly at mid-portions thereof, the bowed portions aligned along a central longitudinal axis of the boat trailer 20.

Two wheel assemblies 70 are attached to the stern section 30. Each wheel assembly 70 comprises an axle 72 with two wheels 24 on each end thereof. The axles 72 extend between and are attached to the rear beams 40, between the cross beams 60a and 60b. The wheels 24 are disposed laterally outwardly from the respective rear beams 40. The axles 72 are also bowed downwardly at mid-portions thereof. Fenders 80 are provided to extend over each lateral pair of wheels 24. The fenders 80 are attached to side extensions 61 (see FIG. 6) of the cross beams 60a and 60b.

The tow bar 26 extends forwardly from the cross beam 60e, between the front ends 52 of the front beams 50, and further forwardly, and terminates with a tow ball coupling 27 at a front end thereof.

Figure 4:
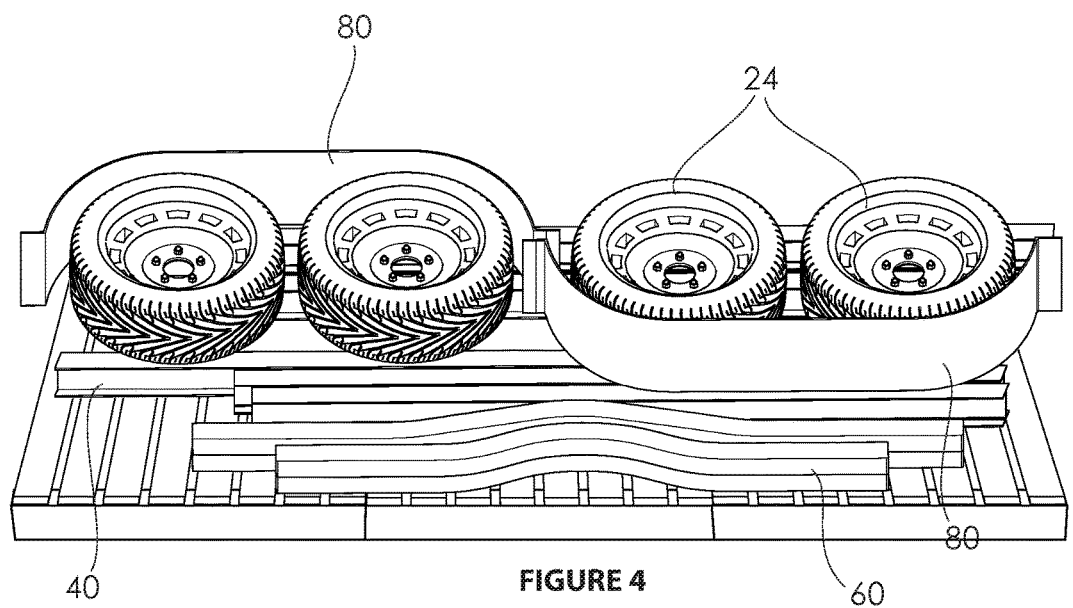
FIG. 4 is a side perspective view of the boat trailer of FIG. 1, in a disassembled shipping configuration thereof.
Figure 5:
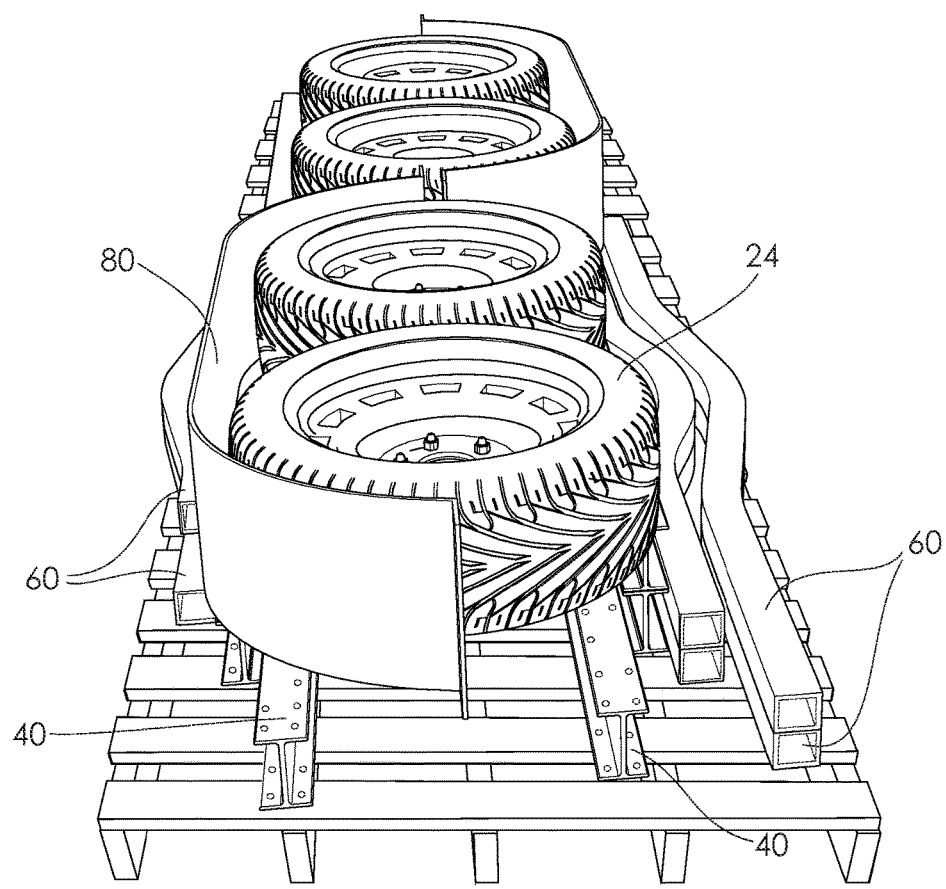
FIG. 5 is a front perspective view of the disassembled boat trailer of FIG. 4.

The components of the boat trailer 20 as above can be disassembled and packed into a substantially flat pack manner along a package having the footprint of three pallets as shown in FIGS. 4 and 5. This reduces the package and transport dimensions of the boat trailer chassis by a substantial amount compared to a typical boat trailer which cannot be disassembled. For another dimension boat trailer 20, such as a 3.2 ton flatpack trailer for 5.5 m to 7.5 m boats, such a disassembled boat trailer 20 will fit on 1 pallet with a footprint of 2.4 m×1.1 m. Smaller trailers will have a footprint of 1.5 m×0.6 m. In general, the footprint of the disassembled flat packed trailer is less than 20 percent of the footprint of the fully assembled trailer.

Assembly of the boat trailer 20 from its flat pack configuration will now be described, including how the beams 40, 44 and 50 are connected to each other.

Figure 6:
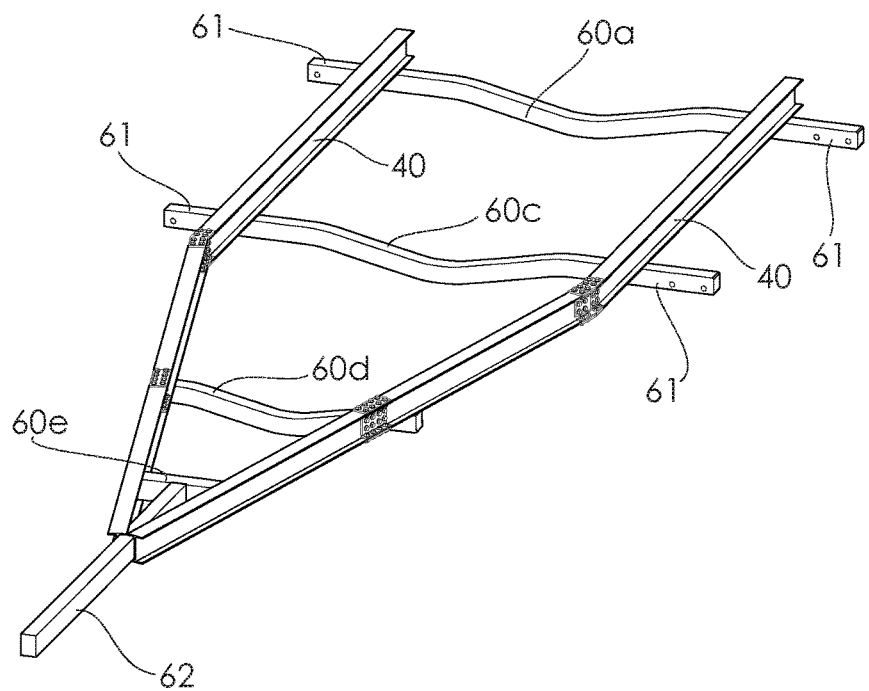
FIG. 6 is a perspective view of an assembled support frame for the boat trailer of FIG. 1.

FIG. 6 shows the general structure of the support frame 22. The support frame 22 in this example is for a shorter boat and does not include the cross beam 60b. Support frames 22 for the boat trailer 20 can be made in any desired dimensions, with the addition or reduction of cross beams 60 being possible as needed.

Figure 7:
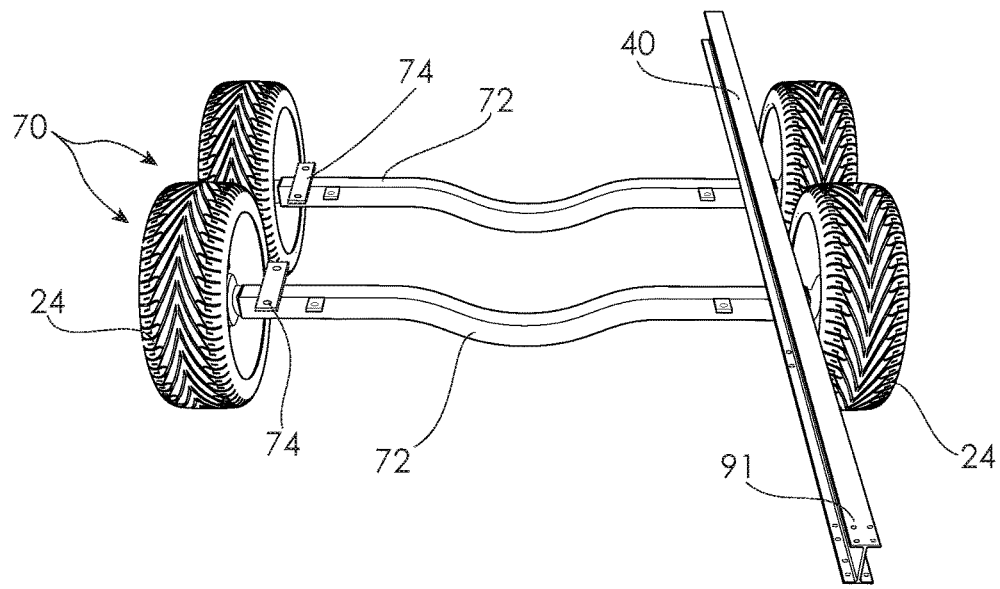
FIG. 7 is a front perspective view of initial steps in assembling the boat trailer.

As shown in FIG. 7, the wheel assemblies 70 are first assembled by connecting a wheel 24 to the end of each axle 72. Each axle 72 comprises an attachment plate 74 adjacent ends thereof for attachment to the beams 40. The attachment plate 74 comprises apertures for alignment with respective apertures formed in bottom flanges 91 of the rear beams 40. Bolts are then inserted through the aligned apertures and nuts complete the locking attachment. The cross beams 60a to 60c are then attached to the rear beams 40 in a similar manner, via bolts inserted in aligned apertures in the beams 60 and corresponding apertures in the bottom flanges 91. The fenders 80 are then attached to the side extensions 81 of the cross beams 60a and 60c. This completes the stern section 30.

Figure 8:
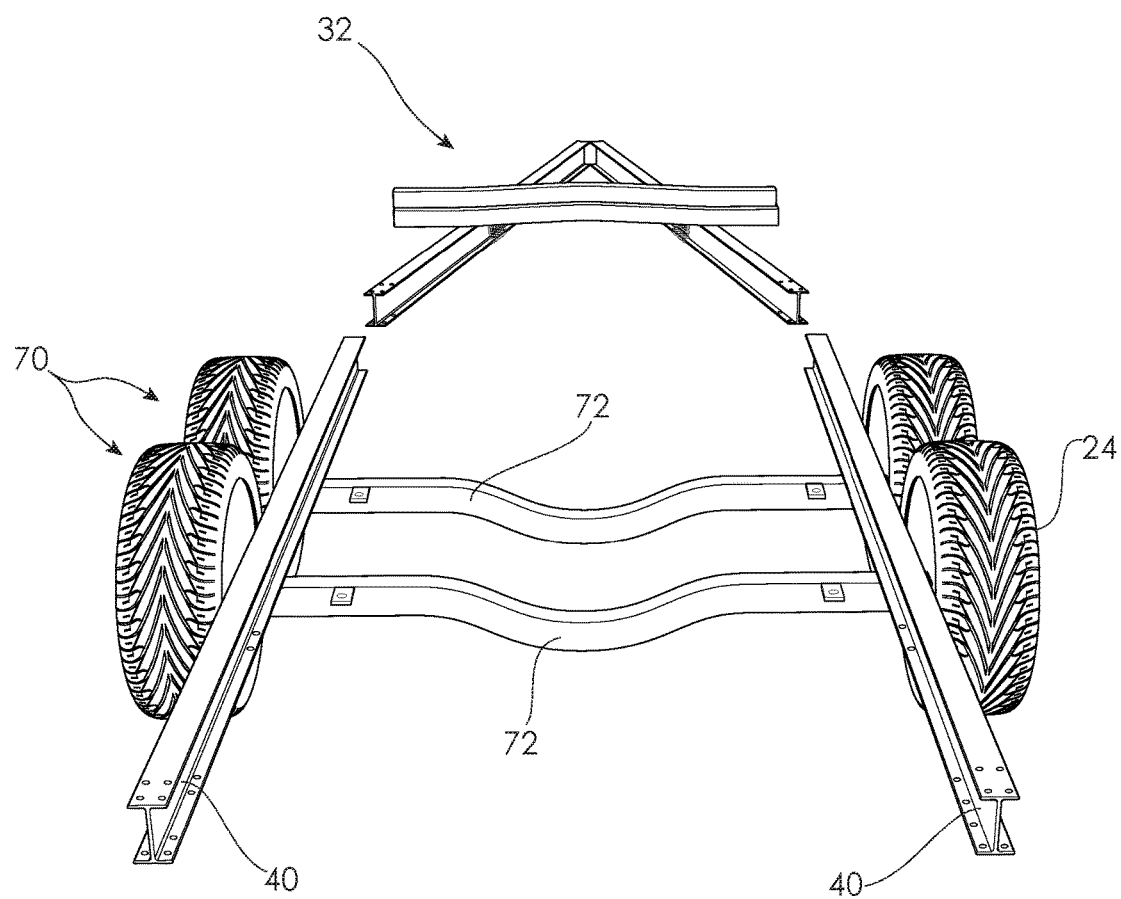
FIG. 8 is a front perspective view of subsequent steps in assembling the boat trailer.

As shown in FIG. 8, the bow section 32 can be assembled separately for connection to the stern section 30. The intermediate beams 44 are connected to the front beams 50 via splice or connection plates (as described below), and the tow bar 26 is connected to the cross beam 60e and the front ends 52 via bolts inserted through aligned apertures thereof.

Figure 9:
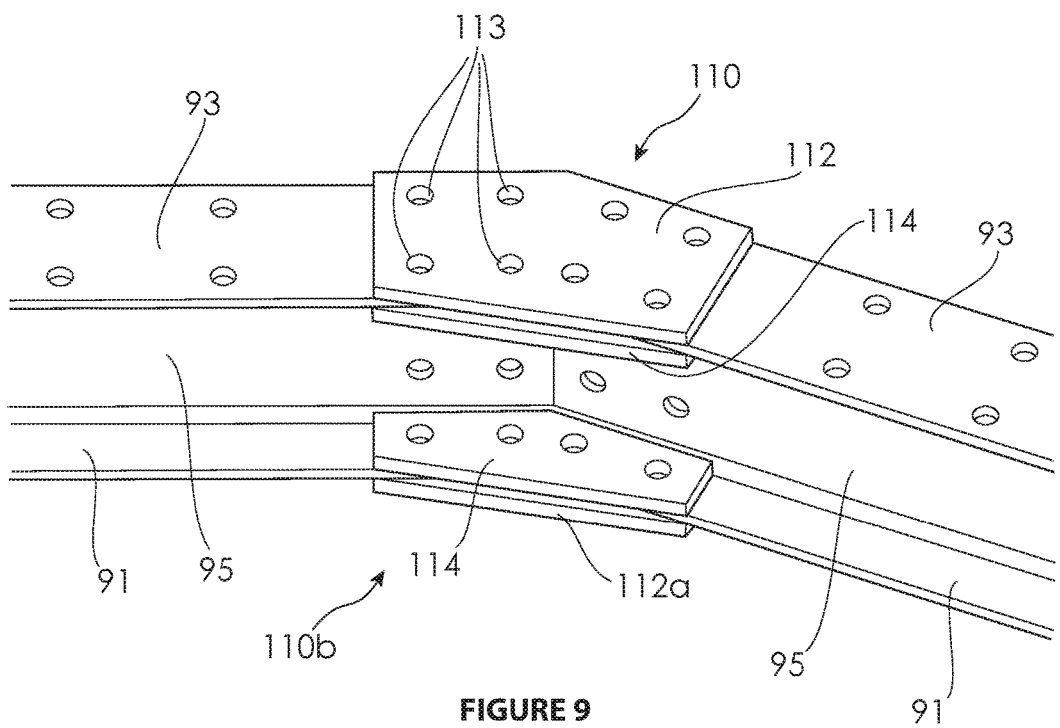
FIG. 9 shows the junction between two frame members angled relative to each other and joining of the frame members via splice plates.
Figure 10:
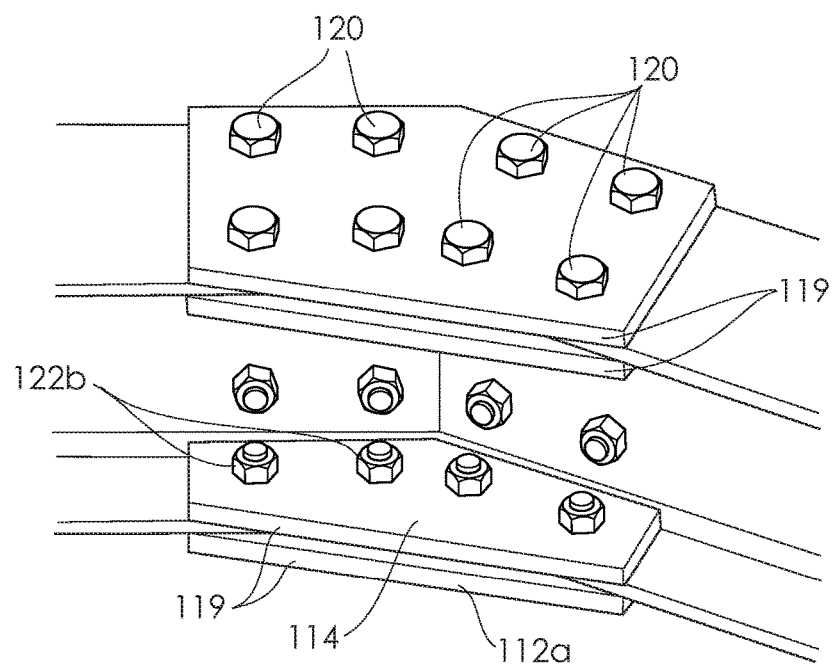
FIG. 10 shows the insertion of attachment bolts and locking nuts to the splice plates of FIG. 9.
Figure 11:
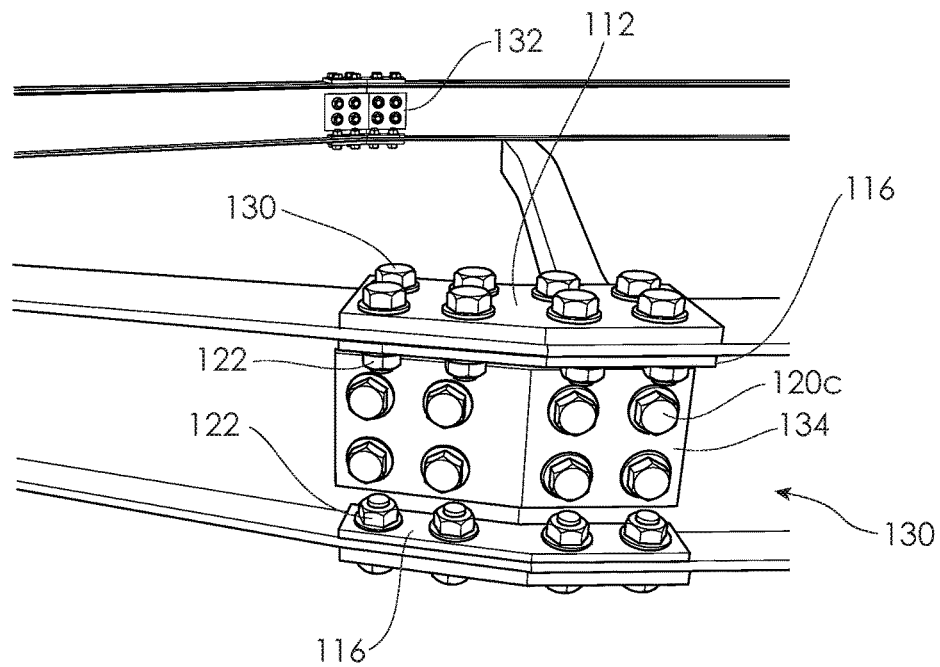
FIG. 11 shows the finished attached splice plates.

FIGS. 9 to 11 show the connection means 100 for connecting the respective adjacent ends of the beams 40, 44 and 50. The junction shown in FIGS. 9 to 11 is the angled junction between the beams 40 and 44, as the beams 44 are angled towards each other. The connection means for the junction between the beams 44 and 50 will be similar and will be for a straight junction.

The connection means 100 comprises a plurality of connection plates spanning across the junction between the respective adjacent beam ends. The connection plates comprise bolt apertures which are disposed to be aligned with corresponding bolt apertures formed in the beams. Each of the beams 40, 44 and 50 are I-beams having a bottom flange 91, a top flange 93 and a vertical web 95 therebetween.

The connection means 100 comprises a top flange set 110 comprising an upper connection plate 112, an inner plate 114 and an outer plate 116. The upper plate 110 extends across the width of the top flanges 93 and comprises spaced bolt apertures 113 at lateral sides thereof which will align with corresponding bolt apertures formed in the top flanges 93 of the beams 40 and 44. The inner and outer plates 114 and 116 are shaped and dimensioned to follow the angled webs 95 of the beams 40 and 44. The inner and outer plates 114 and 116 comprises bolt apertures and are disposed to the underside of the top flange 93, at opposing sides of the webs 95. Attachment bolts 120 are then inserted through the aligned holes of the top flange set 110 and the top flange 93, with nuts 122 locking the attachment, which connects the top flanges 93.

The connection means 100 also comprises a bottom flange set 110b, which is similar and is a mirror of the top flange set 110. The bottom flange set 110 comprises a lower connection plate 112a, and similar inner plate 114 and outer plate 116. The lower plate 112a extends across the width of the bottom flanges 91. The inner and outer plates 114 and 116 are disposed to the upper side of the bottom flanges 91, at opposing sides of the webs 95. Similarly as above, attachment bolts 120b are inserted through aligned holes of the bottom flange set 110b and the bottom flanges 91, with nuts 122c locking the attachment, which connects the bottom flanges 91.

The connection means 100 further comprises a web plate set 130 comprising an inner web plate 132 and an outer web plate 134. The web plates 132 and 134 substantially extend across the height of the webs 95 and comprises spaced bolt apertures therein which will align with corresponding bolt apertures formed in the web plates 95. The inner and outer web plates 132 and 134 are disposed to opposing sides of the webs 95, and are bent to follow the angle of the webs 95 of the beams 40 and 44. Attachment bolts 120c are then inserted through the aligned holes of the web plate set 130 and the webs 95, with nuts locking the attachment, which connects the webs 95.

This completes the connection of the bow section 32 to the stern section 30.

The inner edges 119 of the top connection plate 112, lower connection plate 112b and the inner plates 114 are provided with a straight edge which extends laterally outwardly from adjacent edges of the top and lower flanges. This provides reinforcement for these plates for the junction.

Figure 13:
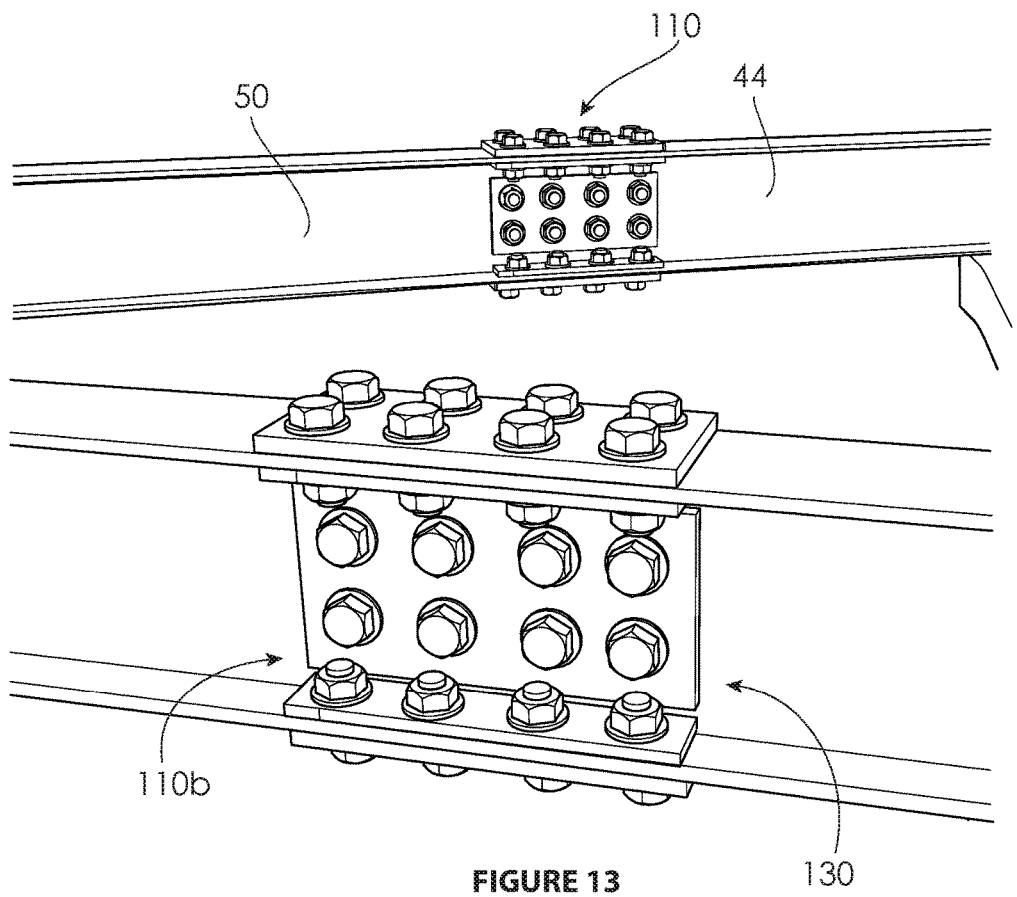
FIG. 13 shows the junction between two straight frame members and joining of the frame members via splice plates.
Figure 14A:
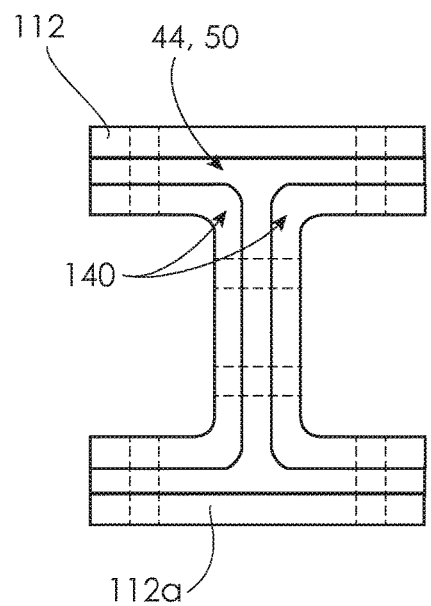
FIG. 14 (a) to (d) show variations and alternatives to the splice plates.
Figure 14B:
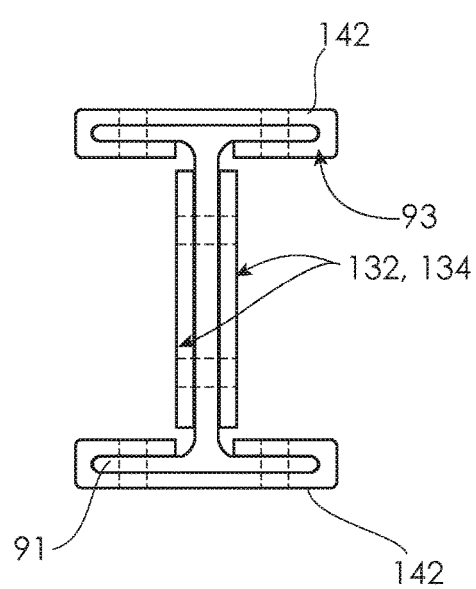
Figure 14C:
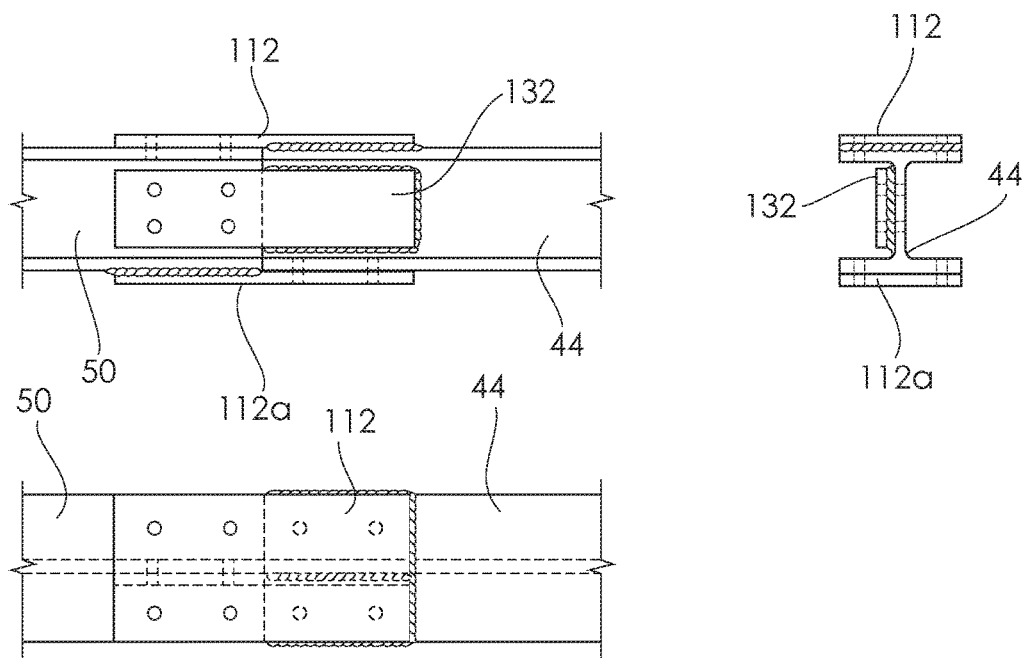
Figure 14D:
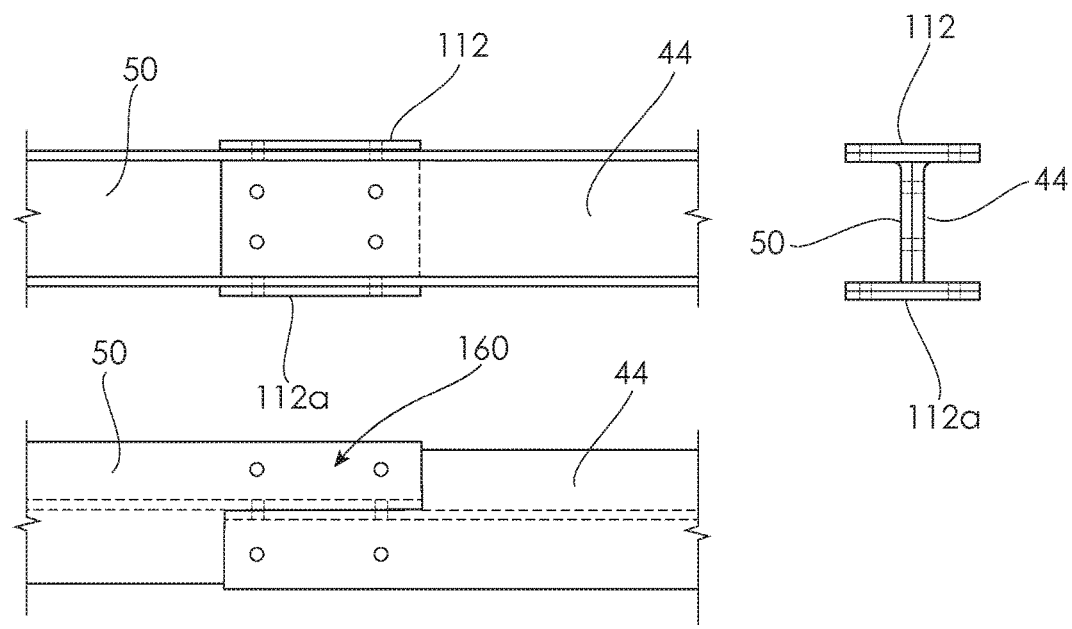

As shown in FIG. 13, a similar connection means having a top flange set 110, bottom flange set 110b and web plate set 130 is provided for the junction between the beams 44 and 50. The plates for this junction are straight plates as the junction is a straight junction.

Upon completion of the boat trailer 20, the desired attachments can then be mounted thereto such as skids, bunks, rollers, guides, winch, etc.

Figure 12:
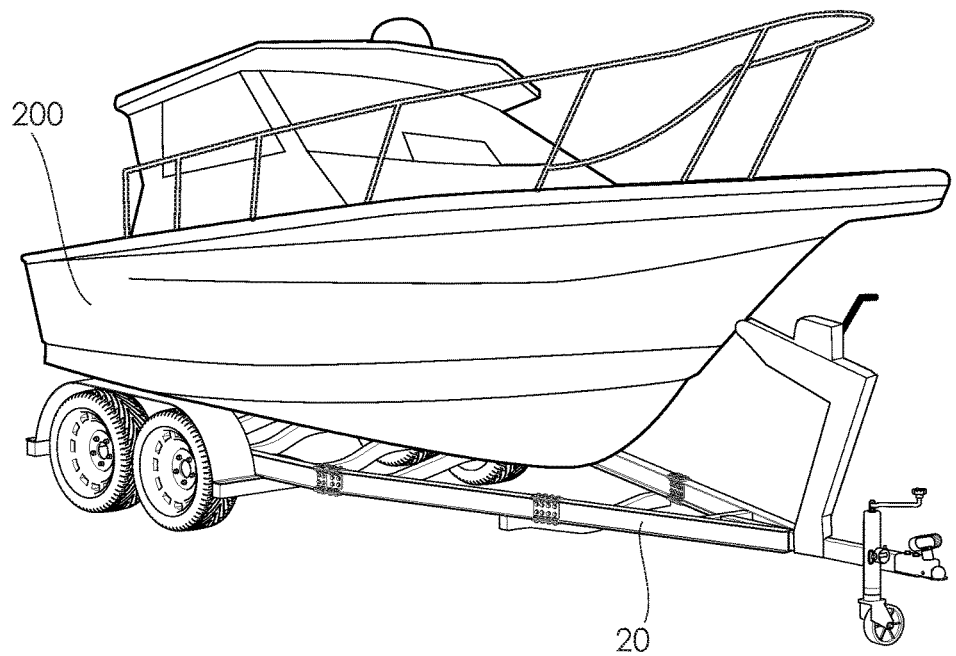
FIG. 12 shows the assembled boat trailer carrying a boat.

FIG. 12 shows the boat trailer 20 having a boat 200 mounted thereon.

The present invention thus provides a boat trailer which can be disassembled to a smaller package for easier storage and transport. The boat trailer can be completed as a complete Do-It-Yourself (DIY) project by the end customer after delivery. The embodiment shown uses an alloy I-beam splice joint.

The Alloy I-beam Splice Joint (straight and angled splice joint) has been designed and tested for use in larger alloy boat trailers allow the boat trailer to be flat-packed, which reduces the space required to store them. The angled splice joint also saves on the cost of bending the I-beam and adds strength to the bend section of the chassis.

The angled splice joint also reduces the fabrication required to bend the main I-beams in trailer manufacturing, which increases structural integrity of the beam and lowers the fabrication cost.

The complete DIY assembly flat-pack system for larger boat trailers will reduce the cost of trailers and the cost of transportation of trailers to distributors and customers.

The complete trailer length can be reduced typically from 10 m long to less than 3 m long and the width reduced from 2.5 m wide to less than 1 m wide.

This DIY flat-pack boat trailer product will allow trailer distributors and dealers to be able to store, transport and sell their trailer stock more easily and much more cost effectively.

It will lower the wholesale and retail cost of trailers by an estimated 20%.

It allows for the disassembly of the trailer for easier storage and transport, if required.

It also allows for easy replacement of the I-beam sections, wiring harness, and braking actuator. The flat pack boat trailer also provides a complete removable wiring harness. The flatpack trailer design includes a removable/replaceable wiring harness. The harness clips into all the electrical components without having to join any wires with crimps and solder joints. This enables anyone to be able to fit the wiring harness or replace it when necessary.

Whilst preferred embodiments of the present invention have been described, it will be apparent to skilled persons that modifications can be made to the embodiments described.

FIG. 14 (*a*) to (*d*) shows modifications and alternatives to the splice plates. In FIG. 14(*a*), the splice plates disposed along the inner surfaces of the beam junctions, (being the plates 114 and 132, and plates 116 and 134) are replaced by C-shaped plates 140, which essentially provides these plates in a joined manner.

In FIG. 14(*b*), the top flange set 110 and the bottom flange set 110*b* are replaced by bent channel splice plates 142 which essentially provides these plates in a joined manner, with the respective channels receiving the top flanges 93 and the bottom flanges 91 therein respectively In FIG. 14(*c*), the upper connection plate 112, lower connection plate 112*a* and a web plate 132 is welded to one of the beams 44 and 50, and then bolted on to the other beam. In the example, the upper connection plate 112 and the web plate 132 are welded to the beam 44 and the lower connection plate 112*a* is welded to the beam 50.

In FIG. 14(*d*), the ends of the beams 44 and 50 are cut to provide a split overlap joint as shown at 160 (upper connection plate 112 being removed for illustration purposes), the ends thereof being mirror cut to provide overlapping portions 49 which can then be bolted to each other. This modification also only uses the upper connection plate 112 and upper connection plate 112 and no web plates.

In another possible embodiment, the frame members can be constructed using rectangular hollow sections (RHS) in either aluminum alloy or steel. The joints between at the frame junctions are then connected with the use of a rectangular insert (either solid or hollow). The insert can be snug fit into the end of one frame member, and on reassembly, inserted into the end of the adjacent frame member. The insert could be welded or bolted on to one frame member and bolted to the other frame member after insertion for reassembly.

The present invention is described in particular use for boat trailers. It is apparent however that the present invention is equally applicable to other trailers such as cargo or vehicle trailers.

We claim:

1. A trailer assembly to be transported in a flat pack form, said trailer assembly comprising:

a support frame having a stern section and a bow section, wherein said stern section is comprised of a first lateral rear beam and a second lateral rear beam, said first lateral rear beam being disposed, spaced and parallel to said second lateral rear beam, said first lateral rear beam having a first lateral rear front end and a first lateral rear back end, said second lateral rear beam having a second lateral rear front end and a second lateral rear back end, wherein said bow section is comprised of a first bow beam and a second bow beam said first bow beam being angled toward said second bow beam, said second bow beam being angled toward said first bow beam, said first bow beam having a first bow front end and a first bow back end, said second bow beam having a second bow front end and a second bow back end, wherein said first lateral rear front end connects to said first bow back end at a first connection junction, said first lateral rear front end having a plurality of first lateral spaced holes, said first bow back end having a plurality of first bow back end spaced holes, and wherein said second lateral rear front end connects to said second bow back end at a second connection junction, said second lateral rear front end having a plurality of second lateral spaced holes, said second bow back end having a plurality of second bow back end spaced holes, wherein said first lateral rear beam is comprised of a first lateral bottom flange, a first lateral top flange, and a first lateral vertical web between said first lateral bottom flange and said first lateral top flange, said first lateral spaced holes are placed on said first lateral bottom flange, said first lateral top flange, and said first lateral vertical web at said first connection junction, wherein said second lateral rear beam is comprised of a second lateral bottom flange, a second lateral top flange, and a second lateral vertical web between said second lateral bottom flange and said second lateral top flange, said second lateral rear spaced holes are placed on said second lateral bottom flange, said second lateral top flange, and said second lateral vertical web at said second connection junction, wherein said first bow beam is comprised of a first bow bottom flange, a first bow top flange, and a first bow vertical web between said first bow bottom flange and said first bow top flange, said first bow back end spaced holes are placed on said first bow bottom flange, said first bow top flange, and said first bow vertical web at said first connection junction, wherein said second bow beam is comprised of a second bow bottom flange, a second bow top flange, and a second bow vertical web between said second bow bottom flange and said second bow top flange, said second bow back end spaced holes are placed on said second bow bottom flange, said second bow top flange, and said second bow vertical web at said second connection junction, wherein said first lateral vertical web is at a first angle to said first bow vertical web at said first connection junction, and wherein said second lateral vertical web is at a second angle to said second bow vertical web at said second connection junction;

a tow bar forming a front section with said first bow front end and said second bow front end, said first bow beam and said second bow beam being angled toward said tow bar; and a first connection means at said first connection junction at said first connection junction, said first connection means being comprised of:

a first upper connection plate extending across said first lateral top flange and said first bow top flange and having first upper connection plate spaced bolt apertures aligned with corresponding first lateral spaced holes on said first lateral top flange and corresponding first bow back end spaced holes on said first bow top flange;

a first lower connection plate extending across said first lateral bottom flange and said first bow bottom flange and having first lower connection plate spaced bolt apertures aligned with the corresponding first lateral spaced holes on said first lateral bottom flange and the corresponding first bow back end spaced holes on said first bow bottom flange;

a first inner web plate extending across an inner side of said first lateral vertical web and said first bow vertical web and having first inner web plate spaced bolt apertures aligned with the corresponding first lateral spaced holes on said first lateral vertical web and the corresponding first bow back end spaced holes on said first bow vertical web; and a first outer web plate extending across an outer side of said first lateral vertical web and said first bow vertical web and having said first inner web plate spaced bolt apertures aligned with the corresponding first lateral spaced holes on said first lateral vertical web and the corresponding first bow back end spaced holes on said first bow vertical web, wherein an said inner side of said first lateral vertical web and said first bow vertical web is opposite an outer side of said first lateral vertical web and said first bow vertical web, said inner side being bent according to a first angle at said first connection, said outer side being bent according to said first angle at said first connection; and a second connection means at said second connection junction at said second connection junction, said second connection means being comprised of:

a second upper connection plate extending across said second lateral top flange and said second bow top flange and having second upper connection plate spaced bolt apertures aligned with the corresponding second lateral spaced holes on said second lateral top flange and corresponding the second bow back end spaced holes on said second bow top flange;

a second lower connection plate extending across said second lateral bottom flange and said second bow bottom flange and having second lower connection plate spaced bolt apertures aligned with the corresponding second lateral spaced holes on said second lateral bottom flange and the corresponding second bow back end spaced holes on said second bow bottom flange;

a second inner web plate extending across an inner side of said second lateral vertical web and said second bow vertical web and having second inner web plate spaced bolt apertures aligned with the corresponding second lateral spaced holes on said second lateral vertical web and the corresponding second bow back end spaced holes on said second bow vertical web; and a second outer web plate extending across an outer side of said second lateral vertical web and said second bow vertical web and having said second inner web plate spaced bolt apertures aligned with the corresponding second lateral spaced holes on said second lateral vertical web and the corresponding second bow back end spaced holes on said second bow vertical web, wherein an inner side of said second lateral vertical web and said second bow vertical web is opposite an outer side of said second lateral vertical web and said second bow vertical web, said inner side being bent according to a second angle at said second connection, said outer side being bent according to said second angle at said second connection.

2. The trailer assembly, according to claim 1, wherein said first connection means is further comprised of:

a first inner under connection plate having a shape corresponding to an underside of said first lateral top flange and said inner side of said first lateral vertical web and said first bow vertical web, said first inner connection plate having first inner connection holes aligned with the corresponding first lateral spaced holes on said first lateral top flange and the corresponding first bow back end spaced holes on said first bow top flange; and a first outer under connection plate having a shape corresponding to said underside of said first lateral top flange and said outer side of said first lateral vertical web and said first bow vertical web, said first inner connection plate having first inner connection holes aligned with the corresponding first lateral spaced holes on said first lateral top flange and the corresponding first bow back end spaced holes on said first bow top flange, and wherein said second connection means is further comprised of:

a second inner under connection plate having a shape corresponding to an underside of said second lateral top flange and said inner side of said second lateral vertical web and said second bow vertical web, said second inner connection plate having second inner connection holes aligned with the corresponding second lateral spaced holes on said second lateral top flange and the corresponding second bow back end spaced holes on said second bow top flange; and a second outer under connection plate having a shape corresponding to said underside of said second lateral top flange and said outer side of said second lateral vertical web and said second bow vertical web, said second inner connection plate having second inner connection holes aligned with the corresponding second lateral spaced holes on said second lateral top flange and the corresponding second bow back end spaced holes on said second bow top flange.

3. The trailer assembly, according to claim 2, wherein said first connection means is further comprised of:

a first inner over connection plate having a shape corresponding to an upperside of said first lateral bottom flange and said inner side of said first lateral vertical web and said first bow vertical web, said first inner connection plate having first inner connection holes aligned with the corresponding first lateral spaced holes on said first lateral bottom flange and the corresponding first bow back end spaced holes on said first bow bottom flange; and a first outer over connection plate having a shape corresponding to said upperside of said first lateral bottom flange and said outer side of said first lateral vertical web and said first bow vertical web, said first inner connection plate having first inner connection holes aligned with the corresponding first lateral spaced holes on said first lateral bottom flange and the corresponding first bow back end spaced holes on said first bow bottom flange, and wherein said second connection means is further comprised of:

a second inner over connection plate having a shape corresponding to an upperside of said second lateral bottom flange and said inner side of said second lateral vertical web and said second bow vertical web, said second inner connection plate having second inner connection holes aligned with the corresponding second lateral spaced holes on said second lateral bottom flange and the corresponding second bow back end spaced holes on said second bow bottom flange; and a second outer over connection plate having a shape corresponding to said upperside of said second lateral bottom flange and said outer side of said second lateral vertical web and said second bow vertical web, said second inner connection plate having second inner connection holes aligned with the corresponding second lateral spaced holes on said second lateral bottom flange and the corresponding second bow back end spaced holes on said second bow bottom flange.

4. The trailer assembly, according to claim 1,
wherein said first bow beam is comprised of a first intermediate beam, having a first rear intermediate end and a first front intermediate end, and a first front beam, having a first rear front end and a first front end,
wherein said second bow beam is comprised of a second intermediate beam, having a second rear intermediate end and second front intermediate end, and a second front beam, having a second rear front end and a second front end,
wherein said first lateral rear front end connects to said first bow back end on said first rear intermediate end, said first front intermediate end connecting to said first rear front end of said first front beam,
wherein said second lateral rear front end connects to said second bow back end on said second rear intermediate end, said second front intermediate end connecting to said second rear front end of said second front beam,
wherein said first intermediate beam and said second intermediate beam angle toward each other,
wherein said first front beam and said second front beam angle toward each other, and
wherein said first front end joins to said second front end.

5. The trailer assembly, according to claim 1, further comprising:
a plurality of cross beams, at least one of the cross beams extending between said first lateral rear beam and said second lateral rear beam, at least another one of the cross beams extending between said first bow beam and said second bow beam, each of the cross beams having a midportion bowed downward.

6. The trailer assembly, according to claim 1, further comprising:
a plurality of wheel assemblies being attached to said stern section, each of the wheel assemblies being comprised of an axle and wheels at each end of said axle, wherein said axle is attached to said first lateral rear beam and said second lateral rear beam, each of the axles having an axle midportion bowed downward.

7. The trailer assembly, according to claim 1, wherein said support frame, said tow bar, said first connection means, and said second connection means have an assembled configuration and a disassembled configuration, said support frame, said tow bar, said first connection means, and said second connection means being separable in said disassembled configuration, said support frame, said tow bar, said first connection means, and said second connection means being fit in flat pack manner into a package having a footprint of less than 20 percent of a footprint of said assembled configuration.

* * * * *